United States Patent [19]

McKay et al.

[11] Patent Number: 5,466,105
[45] Date of Patent: Nov. 14, 1995

[54] FASTENER ASSEMBLY FOR INSTALLING VALVE DEVICES AND THE LIKE

[75] Inventors: Albert A. McKay, Stoney Creek, Canada; James E. Hart, Trafford, Pa.

[73] Assignee: Westinghouse Air Brake Company, Wilmerding, Pa.

[21] Appl. No.: 257,758

[22] Filed: Jun. 9, 1994

[51] Int. Cl.[6] .................... F16B 27/00; F16B 35/02; F16B 39/00
[52] U.S. Cl. .................... 411/84; 411/107; 411/383; 411/396; 411/966; 403/337
[58] Field of Search .................... 411/84, 87, 88, 411/93, 94, 107, 377, 383, 396, 966, 970, 999; 403/337

[56] References Cited

U.S. PATENT DOCUMENTS

| | | | |
|---|---|---|---|
| 856,246 | 6/1907 | Gamon | 411/84 |
| 1,200,297 | 10/1916 | Bates | 411/966 X |
| 1,835,710 | 12/1931 | Jenkins et al. | 411/84 |
| 2,594,599 | 4/1952 | Uhri | 411/966 X |
| 2,761,484 | 9/1956 | Sternick et al. | 411/107 X |
| 2,921,655 | 1/1960 | McGregor | 411/966 X |
| 3,456,706 | 7/1969 | Ollis, Jr. | 411/84 |
| 4,739,601 | 4/1988 | Beine | 411/396 |
| 4,753,560 | 6/1988 | Ryder | 411/377 X |

*Primary Examiner*—Neill R. Wilson
*Attorney, Agent, or Firm*—Gary J. Falce

[57] ABSTRACT

A fastener assembly for installing valve devices and the like on one side of a mounting plate by bolts where the bolt holes are without threads and the opposite side of the mounting face is inaccessible for holding a bolt head or nut from turning. The fastener assembly includes at least one fastener plate and a minimum of two threaded bolts affixed thereto, so that the threaded portion of the bolts projects through bolt holes in the mounting plate. A retaining washer is threaded onto the projecting bolt threads to retain the fastener plate in place while the valve device is being installed onto the projecting bolt threads on which lock nuts are subsequently screwed to secure the installation. Tightening of the lock nuts without consequent rotation of the fastener plate bolts is achieved by reason of the torque imparted to one bolt being transferred via the fastener plate to the other bolt thereof, which is constrained from moving in an arcuate path by the hole in which it is disposed to thereby prevent rotation of the one bolt as the nut is screwed down.

18 Claims, 3 Drawing Sheets

5,466,105

FASTENER ASSEMBLY FOR INSTALLING VALVE DEVICES AND THE LIKE

BACKGROUND OF THE INVENTION

The present invention is related to valve mounting installations and particularly to a fastening arrangement for mounting a valve device or the like on one side of a mounting plate or platform where access to the other side is generally limited and/or not practical.

One exemplary application of such a mounting installation is in the railroad industry where empty/load type valves are employed to sense a railroad car load condition in order to adjust the car braking effect accordingly and thereby prevent the occasion of slid flat wheels. Empty/load valves may be mounted on the slope sheet of certain types of railroad cars, in order to directly measure the weight of the commodity being transported, as opposed to indirectly measuring the car load condition by detecting spring deflection when mounted between the car body and truck.

In sensing the car load condition by directly measuring the weight of the commodity, an empty/load type valve is typically mounted on the slope sheet in surrounding relationship with a relatively large opening in the slope sheet. A heavy duty membrane associated with the empty/load valve encloses the opening so as to be increasingly deflected as the car is filled with the commodity being transported, such deflection being translated into the appropriate load setting of the empty/load valve.

In mounting the empty/load valve on the slope sheet, a plurality of cap screws may be employed. This, however, entails a costly operation to machine correspondingly threaded openings in the slope sheet with which the cap screws may be threadedly engaged. Alternatively, through openings may be made in the slope sheet without threads via which bolts may be passed freely. This requires that the mounting bolts be utilized with nuts, preferably of the locking type, to secure the empty/load valve in place. While this approach saves the expense of machining screw threads, it requires the time of an additional worker to hold the bolt head or nut from the inside of the car to prevent it from turning, while another worker turns the head or nut from the opposite side. It will be appreciated that this also entails expense in terms of man hours, which is exacerbated where safety regulations require a third person as an observer to safeguard the worker inside the car.

Still another alternative is to weld a threaded bolt or stud to the slope sheet so that a nut can be threaded in place without the bolt or stud turning. However, this requires removal of a broken bolt or stud, which entails a difficult operation.

SUMMARY OF THE INVENTION

It is an object of the present invention to provide a low-cost fastener arrangement for blind mounting applications that requires no more than a single worker to achieve the installation and subsequent disassembly of same.

Briefly, this objective is achieved by means of at least one fastener plate on one side of which is affixed at least two screw members that project from through holes in two members to be joined together when the one side of the fastener plate is engaged with a surface of one of the members to be joined opposite the mating face of the one member. Corresponding nuts are screwed onto the projecting ends of the respective screw members to secure the joined members together, such being achieved without the turning torque of the nuts effecting rotation of the screw members due to their interconnection via the common fastener plate.

BRIEF DESCRIPTION OF THE DRAWINGS

These and other objects and advantages of the invention will become apparent from the following more detailed explanation when taken in conjunction with the drawings in which.

DESCRIPTION AND OPERATION

Figure 5:
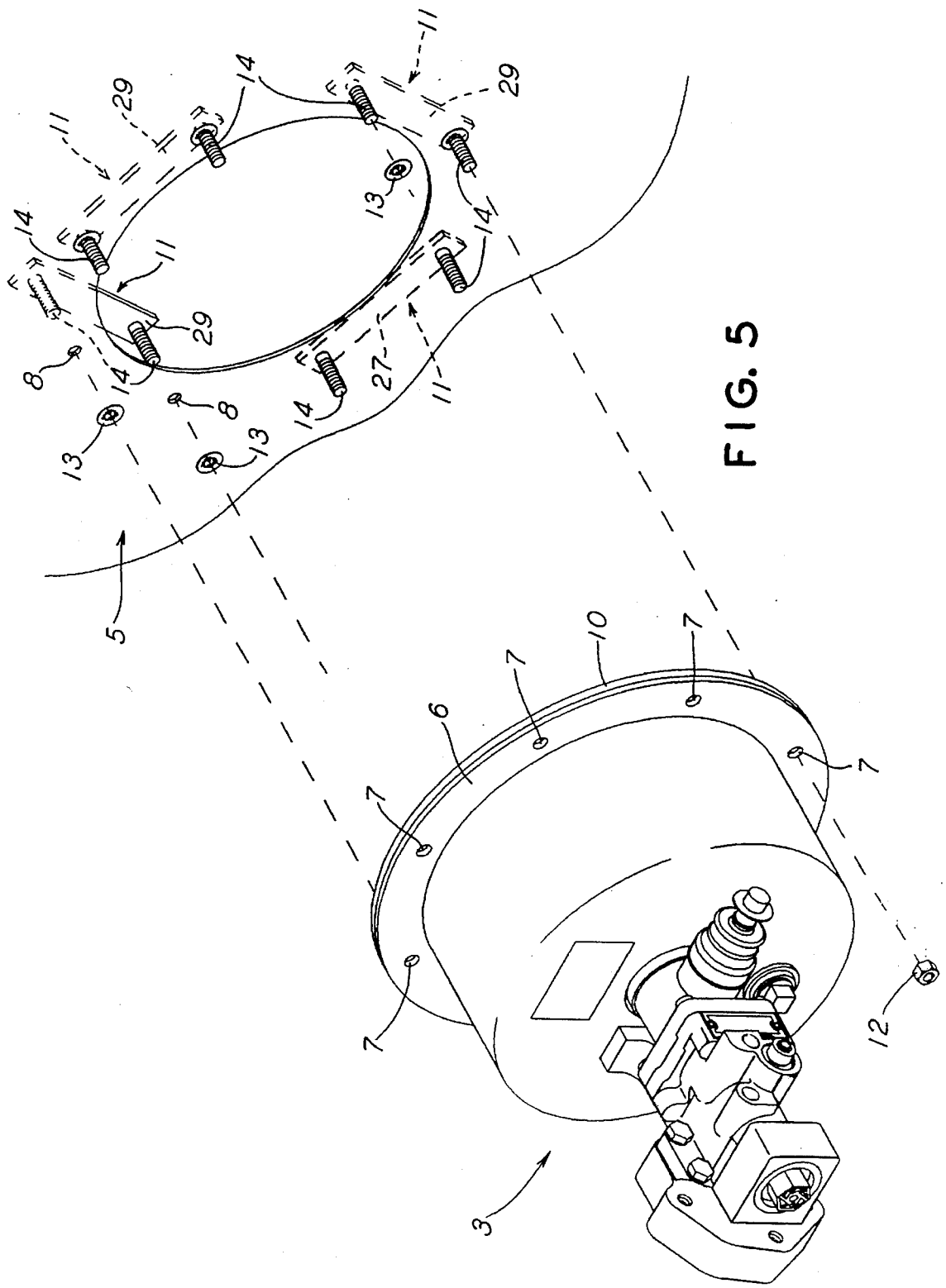
FIG. 5 is an exploded view showing the installation of an empty/load valve on the slope sheet of a railway car employing the fastener arrangement of the present invention including the fastener plate of the FIG. 4 embodiment.

In accordance with the present invention, there is provided a fastener plate assembly 1 with which to secure the mounting of a first member, such as empty/load valve device 3, to a second member, such as the slope sheet 5 of a railroad car, as shown in FIG. 5. Empty/load valve device 3 is provided with a mounting flange 6 having a plurality of unthreaded bolt holes 7. These bolt holes 7 are aligned with a corresponding plurality of bolt holes 8 that surround an opening 9 in slope sheet 5 and which are also unthreaded. Empty/load valve device 3 further includes a load sensing membrane 10 that encloses opening 10 in the installed position of empty/load valve device 3 on slope sheet 5. Such installation of empty/load valve device 3 is facilitated by fastener plate assembly 1, which makes possible the bolting of empty/load valve device 3 to slope sheet 5 without requiring the bolt holes 7, 8 to be threaded and without requiring either a bolt or accompanying nut to be held against rotation while tightening the other.

Fastener plate assembly 1 comprises a fastener plate 11, a plurality of locking nuts 12, and a corresponding plurality of retaining washers 13. Several embodiments of fastener plate 11 of assembly 1 are illustrated in FIGS. 1–4, each fastener plate 11 being comprised of at least two screw-threaded studs 14 that are affixed to the fastener plate without rotation, as hereinafter explained. These studs 14 are arranged so that upon installation of the fastener plate 11, the studs are aligned with bolt holes 7, 8.

Figure 1:
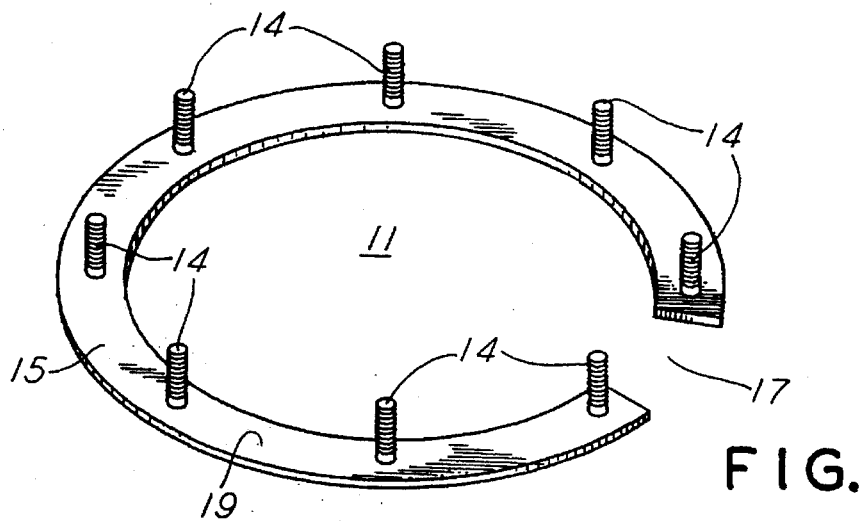
FIGS. 1, 2, 3 and 4 are isometric views showing various embodiments of a fastener plate employed in the fastener arrangement of the present invention.

In the embodiment of FIG. 1, fastener plate 11 consists of a unitary ring member 15 that is annular in shape, being sized to fit around the inside periphery of opening 9 in slope sheet 5. Unitary plate member 15 is split radially so as to be non-continuous by reason of a separation 17. This separation is wide enough to allow one end of the split fastener ring to be flexed laterally relative to the other end in order to be initially placed into the slope sheet opening 9, which is smaller than the fastener ring. Rotating the fastener ring during subsequent assembly allows installation within opening 9 around the inside of the opening. Separation 17 also allows the fastener ring to flex slightly circumferentially, such flexure permitting minor variation in the alignment of the studs 14 with holes 8 in slope sheet 5 to accommodate slight mis-alignment due to manufacturing tolerances. The screw-threaded studs 14 are affixed to plate 15, so as to project from one side 19.

Figure 2:
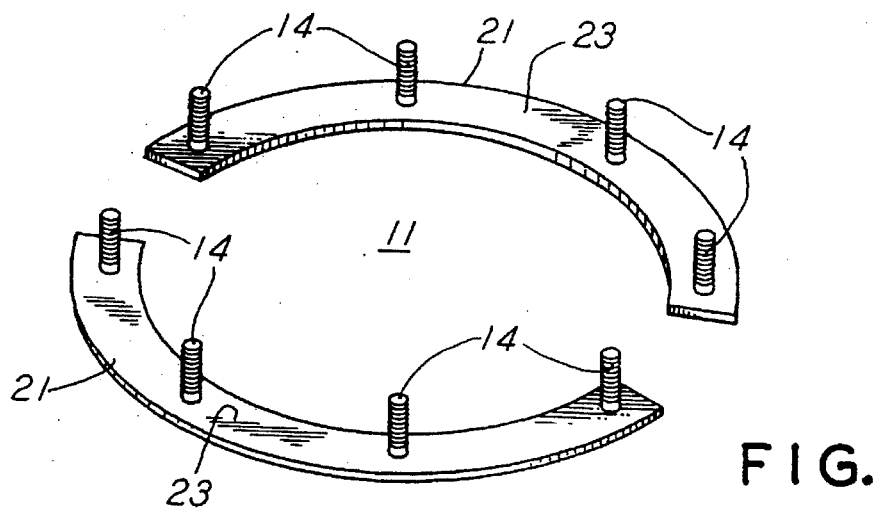

In the embodiment of FIG. 2, fastener plate 11 consists of a pair of separate plate segments 21, each having one-half of the total number of studs 14 corresponding to bolt holes 7, 8. These fastener plates 21, are semi-circular, ring-shaped segments on one side 23 of which project the screw-threaded studs 14.

Figure 3:
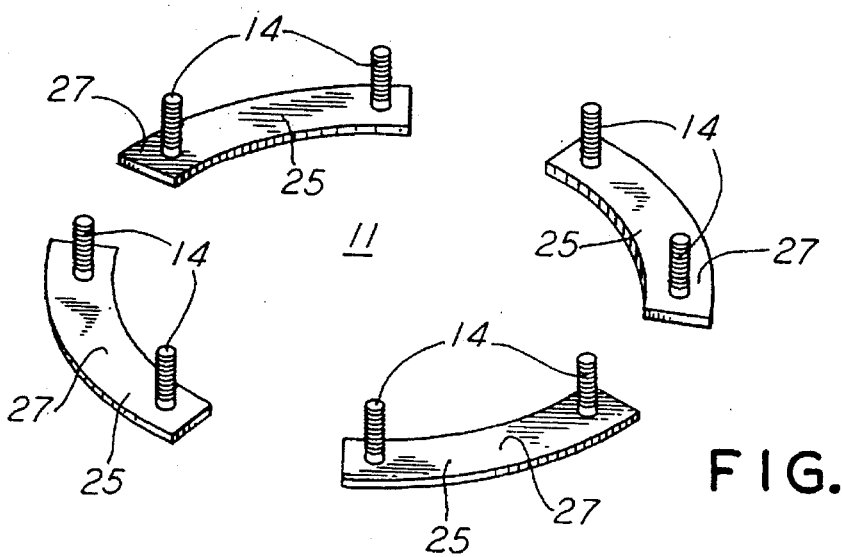

In the embodiment of FIG. 3, fastener plate 11 consists of four separate plate segments 25, each being one-quarter the total number of studs 14 corresponding to bolt holes 7, 8. These fastener plates are also semicircular, ring-shaped segments on one side 27 of which project the screw-threaded studs 14. In the present example, there are a total of eight bolt holes 7, 8 and consequently a corresponding number of studs 14. In accordance with the present invention, as hereinafter explained, a minimum of two such studs 14 are required per fastener plate segment, which is the case in the embodiment of FIG. 3.

Figure 4:
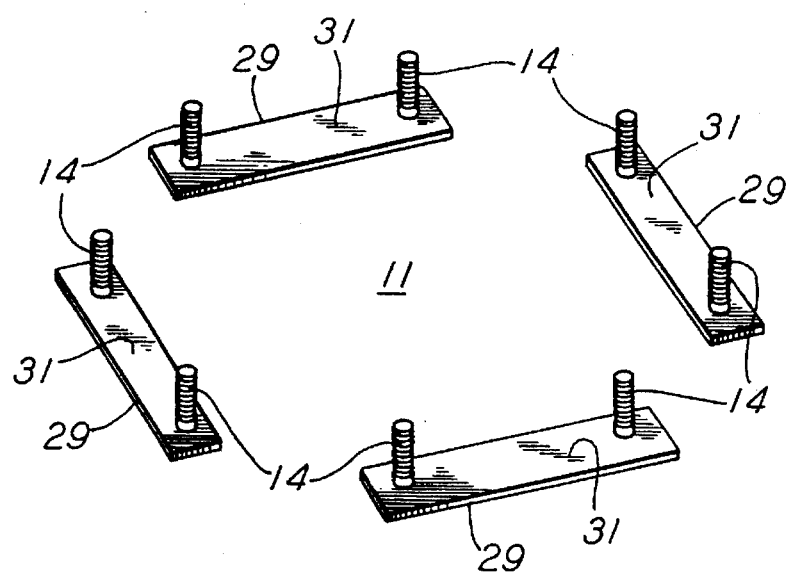
Figure 6:
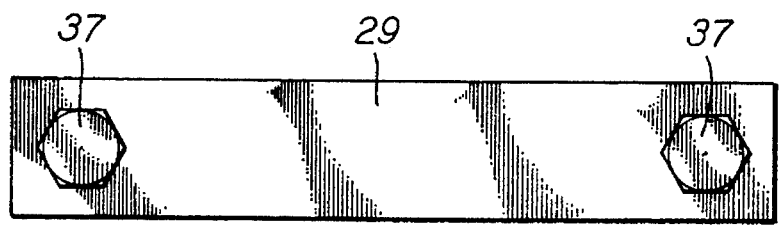
FIG. 6 is a plan view of the fastener plate of FIG. 4.
Figure 7:
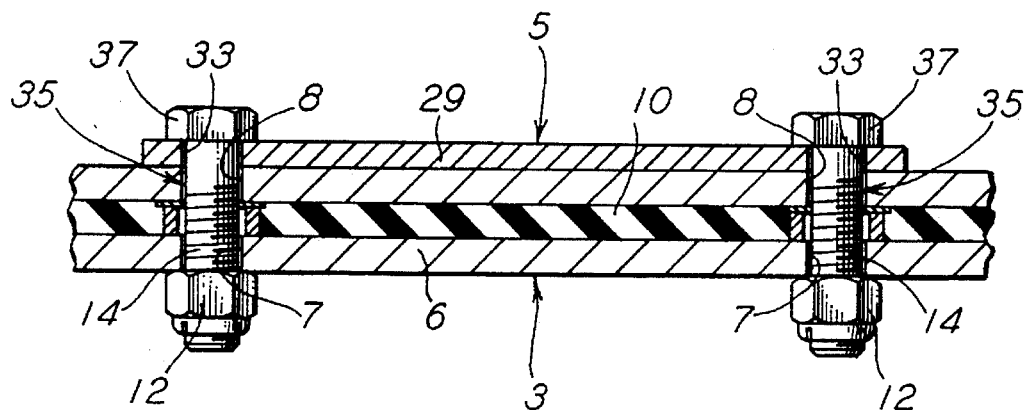
FIG. 7 is a section view showing the fastener plate arrangement of FIG. 4, as employed in the mounting installation of FIG. 5.

In the embodiment of FIG. 4, the fastener plate 11 consists of four fastener bars 29, each having a minimum of two studs 14, as in FIG. 3. However, these fastener bars 29 are not semi-circular segments, as in the case of FIG. 3, but are rectangular-shaped, with studs 14 projecting from one side 31. The preferred manner in which studs 14 are affixed to fastener plate 15 is illustrated in FIGS. 6 and 7. Fastener bars 29 are provided with holes 33 in which commonly available bolts 35 are located. The threaded end of bolts 35 constitute studs 14 and are smaller in diameter than holes 33 such that the bolts 35 pass freely therethrough, until the hex head 37 engages the fastener bar 29. In order to prevent rotation of bolts 35, each bolt head 37 is spot welded to fastener bar 29. Other means of affixing the bolts 35 to the respective fastener bar 29 are within the scope of the present invention.

Returning now to FIG. 5, the invention will be explained with fastener plate assembly 1 employing a fastener plate 11, in accordance with the embodiment of FIG. 4, such fastener plate 11 consisting of the four fastener bars 29, each having a pair of bolts 35, as above explained. Prior to mounting empty/load valve device 3 on slope sheet 5, the four fastener bars 29 are installed by reaching through opening 9 and pushing the threaded studs 14 through holes 8 in slope plate 5 from the inside out. The fastener bars 29 are held in place, with the side 31 bearing against the inside surface of slope sheet 5, by retaining washers 13, which are threaded onto the projecting studs 14 until engagement with the outside surface of slope sheet 5 occurs. In this manner, the fastener bars 29 are secured in position to receive the mounting flange 6 and load sensing membrane 10 of empty/load valve device 3 without having to hold the fastener bars in place manually.

It will be appreciated that any of the other fastener plates 11 in the embodiments of FIGS. 1–3 may be employed in a similar manner to provide the projecting studs 14 by which means the empty/load valve device 3 is to be mounted on slope sheet 5. While unitary plate member 15 offers the capability of slight flexure to facilitate alignment of studs 14 with holes 8 in slope sheet 5, it is believed such alignment is best achieved by segmenting the fastener plate 11, as in the embodiments of FIGS. 2, 3 and 4, in order to reduce the number of studs 14 per fastener plate 21, 25 and 29, and thereby minimize the alignment requirements according to the number of fastener plate segments.

With the fastener bars 29 of fastener plate 11 in position, as above-explained, empty/load valve device 3 may now be mounted on the slope sheet 5 by positioning flange 6 so that the projecting studs 14 enter holes 7 in flange 6. The length of studs 14 is such as to project beyond flange 6 when the face of flange 10 abuts the mating face of slope sheet 5. The distance studs 14 project beyond flange 6 is sufficient to accommodate locking nuts 12.

In tightening locking nuts 12, rotation of studs 14 due to the torque imparted by the tightening action is resisted by the fact that the respective studs are interconnected through the fastener bars 29. Torque imparted to any one of the studs 14 can only result if the other stud 14 of the corresponding fastener bar 29 is free to swing in an arcuate path. Being constrained by its insertion through hole 8, however, this other stud can not move arcuately and thus the stud 14 associated with the nut 12 being tightened can not turn. Consequently, the locking nuts 12 can all be tightened to secure the mounting of empty/load valve device 3 on slope sheet 5. It will be appreciated, therefore, that the fastener plate assembly of the present invention makes it possible to mount the empty/load valve device 3 on slope sheet 1 without requiring the bolt holes in either flange 6 of the empty/load valve device 3 or slope sheet 5 to be threaded and without requiring a second person on the inside of the railroad car to hold the mounting bolts or associated nuts from turning.

We claim:

1. For securing a first member to a second member on which the first member is mountable by means of at least two screw members that project from corresponding through holes in the first and second members that are without threads, a fastener assembly comprising;

a) an annular fastener plate having a single separation therein;

b) said at least two screw members being affixed to one side of said annular fastener plate so as to project from said through holes when said one side of said annular fastener plate is engaged with a face of said first member opposite the mating face thereof with which a mating face of said second member is engageable; and c) a corresponding nut member for said at least two screw members having screw-threaded engagement therewith.

2. A fastener assembly as recited in claim 1, further comprising means for retaining said one side of said fastener plate in engagement with said opposite face of said first member.

3. A fastener assembly as recited in claim 2, wherein said retaining means is a washer having screw-threaded engagement with said at least two screw members, said washer of each said screw member being engageable with said mating face of said first member.

4. For securing a first member to a second member on which the first member is mountable by means of at least two screw members that project from corresponding through holes in the first and second members that are without threads, a fastener assembly comprising:

a) at least one fastener plate;

b) said at least two screw members being affixed to one side of said at least one fastener plate so as to project from said through holes when said one side of said at least one fastener plate is engaged with a face of said first member opposite the mating face thereof with which a mating face of said second member is engageable;

c) means for retaining said one side of said at least one fastener plate in engagement with said opposite face of said first member, said retaining means being a washer for at least one of said at least two screw-threaded members having screw-threaded engagement therewith such as to engage said mating face of said first member; and d) a corresponding nut member for said at least two screw members having screw-threaded engagement therewith.

5. A fastener assembly as recited in claim 4, wherein said at least one fastener plate is an annular ring.

6. A fastener assembly as recited in claim 5, wherein said annular ring has a single separation therein.

7. A fastener assembly as recited in claim 4, wherein said at least one fastener plate comprises a plurality of individual fastener plate segments.

8. A fastener assembly as recited in claim 7, wherein said plurality of fastener plate segments is comprised of a first and a second fastener plate segment, each having said at least two screw members.

9. A fastener assembly as recited in claim 8, wherein each said first and second fastener plate segment has a corresponding number of said at least two screw members.

10. A fastener assembly as recited in claim 8, wherein said plurality of fastener plate segments is further comprised of third and fourth segments, each having said at least two screw members.

11. A fastener assembly as recited in claim 8, wherein said first and second fastener plate segments are arcuately-shaped.

12. A fastener assembly as recited in claim 9, wherein said first, second, third and fourth fastener plate segments are arcuately-shaped.

13. A fastener assembly as recited in claim 7, wherein said plurality of individual fastener plate segments are rectangular-shaped.

14. A fastener assembly as recited in claim 13, wherein each said rectangular-shaped fastener plate segment includes two said screw members.

15. A fastener assembly as recited in claim 4, wherein each of said at least two screw members comprises a bolt having a head and a screw-threaded shank, said at least one fastener plate having holes corresponding in number to said at least two screw members in which said shank of a respective bolt is received so as to project from said one side of said at least one fastener plate, said head being fixedly engaged with a side of said at least one fastener plate opposite said one side thereof.

16. A fastener assembly as recited in claim 4, wherein said head of each said at least two screw members is spot welded to said opposite side of said fastener plate to prevent rotation of said at least two screw members relative to said fastener plate.

17. For securing a first member to a second member on which the first member is mountable by means of at least two screw members that project from corresponding through holes in the first and second members that are without threads, a fastener assembly comprising:

a) a plurality of individual rectangular-shaped fastener plate segments;

b) said at least two screw members being affixed to one side of said at least one fastener plate so as to project from said through holes when said one side of said at least one fastener plate is engaged with a face of said first member opposite the mating face thereof with which a mating face of said second member is engageable; and c) a corresponding nut member for said at least two screw members having screw-threaded engagement therewith.

18. A fastener assembly as recited in claim 17, wherein each said rectangular-shaped fastener plate segment includes two said screw members.

* * * * *